United States Patent [19]

Ryntz et al.

[11] Patent Number: 4,804,732

[45] Date of Patent: * Feb. 14, 1989

[54] POLYSILOXANE GRAFT COPOLYMERS, FLEXIBLE COATING COMPOSITIONS COMPRISING SAME AND BRANCHED POLYSILOXANE MACROMERS FOR PREPARING SAME

[75] Inventors: Rose A. Ryntz, Clinton Township, Lenawee County; Kenneth R. Kurple, Anchorville, both of Mich.

[73] Assignee: E. I. Du Pont de Nemours and Company, Wilmington, Del.

[ * ] Notice: The portion of the term of this patent subsequent to Jun. 28, 2005 has been disclaimed.

[21] Appl. No.: 151,540

[22] Filed: Feb. 2, 1988

Related U.S. Application Data

[62] Division of Ser. No. 18,337, Feb. 24, 1987, Pat. No. 4,754,014, which is a division of Ser. No. 816,485, Jan. 6, 1986, Pat. No. 4,673,718.

[51] Int. Cl.$^4$ .............................................. C08G 77/04
[52] U.S. Cl. ...................................... 528/28; 525/474; 525/476; 525/477; 525/479; 528/26; 528/27; 528/32; 528/33; 528/41

[58] Field of Search ....................... 528/28, 26, 27, 32, 528/33, 41; 525/474, 476, 477, 479

[56] References Cited

U.S. PATENT DOCUMENTS

| | | | |
|---|---|---|---|
| 4,208,471 | 6/1980 | Bresak et al. .......................... | 528/27 |
| 4,673,718 | 6/1987 | Ryntz et al. ........................... | 528/32 |

*Primary Examiner*—Melvyn I. Marquis
*Attorney, Agent, or Firm*—Hilmar L. Fricke

[57] ABSTRACT

A thermosetting coating composition adapted to form a flexible cured coating over a variety of substrates, such as metal and plastic containing a hydroxy functional urethane modified polysiloxane graft copolymer and an alkylated melamine crosslinking agent. The copolymer has a number average molecular weight between about 1,000 and about 4,000, has a hydroxyl number between about 30 and about 300, contains about 1-10 urethane linkages per molecule and is the reaction product of carbon-carbon double bond-reactive monoethylenically unsaturated monomer with hydroxy functional carbon-carbon double bond-bearing branched polysiloxane macromer. The macromer is the reaction product of glycidyl methacrylate and hydroxy functional polysiloxane reactant containing 1-10 urethane linkages per molecule.

14 Claims, No Drawings

POLYSILOXANE GRAFT COPOLYMERS, FLEXIBLE COATING COMPOSITIONS COMPRISING SAME AND BRANCHED POLYSILOXANE MACROMERS FOR PREPARING SAME

CROSS REFERENCE TO RELATED APPLICATIONS

This application is a divisional application of Ser. No. 018,337 filed Feb. 24, 1987 now U.S. Pat. No. 4,754,014 which is a divisional application of Ser. No. 816,485 filed Jan. 6, 1986, now U.S. Pat. No. 4,673,718.

TECHNICAL FIELD

This invention relates to resins and flexible coating compositions comprising same which have excellent adherence to metal and plastic and possess superior weathering properties. More particularly, the invention relates to hydroxy functional polysiloxane graft copolymers and to coating compositions comprising same.

BACKGROUND

Recently, there has been interest in the use of resilient coating materials for areas which are subject to mechanical shock, such as automobile bumpers, moldings and front ends. To maintain the desired appearance for a protective coating on a motor vehicle body panel or like application, any such coating must have certain properties, such as a high degree of extensibility, impact resistance, and resistance to cracking and degradation under severe environmental conditions such as low temperature and high humidity. Conventional coatings, including those heretofore employed on rubber and similar extensible objects, do not have the required combination of properties. Generally, compositions that are flexible enough to be applied over both metal and plastic substrates have rather poor weatherability, appearance, and/or overall durability.

U.S. Pat. Nos. 3,882,189 and 3,962,522 are exemplary of numerous patents which describe flexible coating compositions, wherein the resin comprises polyurethane modified polyesters formed by reacting polyisocyanate with polyester polyols. These resins are cured with amine-aldehyde crosslinkers. It is taught therein, that the presence of the urethane groups in the polymer significantly contributes to the flexibility as well as improved weathering properties, gloss, and abrasion resistance of the coating. Such coatings, however, are not of an overall quality to meet certain applications, particularly automotive applications. Accordingly, it is an object of the present invention to provide novel polysiloxane graft copolymers and solvent based, thermosetting coating compositions comprising same, suitable to produce flexible cured coatings with good adhesion over diverse substrates including metal and plastic. In this regard, it is a particular object of the invention to provide such flexible coating compositions at sufficiently low Volatile Organic Content (VOC) to aid in meeting governmental emissions guidelines and yet which can be applied to a substrate by spraying or other known methods. It is another object of the invention to provide a composition which will form a coating on a substrate, which coating has advantageous physical properties including, for example, humidity and solvent resistance, flexibility and corrosion protection for the underlying substrate.

Additional aspects and advantages of the invention will be apparent from the following description thereof.

DISCLOSURE OF THE INVENTION

According to the present invention, a novel, non-gelled, hydroxy functional polysiloxane graft copolymer is provided. The copolymer is crosslinkable by hydroxy-reactive crosslinking agent and, in particular, is suitable for use in thermosetting coating compositions adapted to form a flexible cured coating over a variety of substrates, such as metal and plastic. The copolymer of the invention has a number average molecular weight between about 1000 and about 15,000, has a hydroxyl number between about 30 and about 300, and is the reaction product of carbon-carbon double bond-reactive monoethylenically unsaturated monomer with hydroxy functional carbon-carbon double bond-bearing branched polysiloxane macromer. This reaction is performed under free radical polymerization reaction conditions and the monomer bears substantially no functionality which would be substantially reactive with the hydroxy functionality of the macromer under such reaction conditions. The macromer is the reaction product of (i) epoxy monomer having the formula:

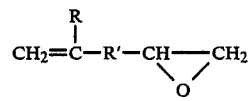

where R preferably is H or alkyl of 1 to about 7 carbons and R' is a hydrocarbon linking moiety, preferably alkyl or $COO(CH_2)_n$, n being 0 to about 7, with (ii) hydroxy functional polysiloxane reactant containing 0–10 urethane linkages per molecule.

According to the coating composition aspect of the invention, the aforesaid copolymer is employed with polyfunctional, hydroxy-reactive crosslinking agent selected from aminoplast crosslinking agent, polyisocyanate crosslinking agent, blocked polyisocyanate crosslinking agent comprising at least two isocyanate groups blocked by reaction with active hydrogen bearing blocking agent, and any compatible mixture thereof. The crosslinking agent is included in an amount sufficient to provide, at a cure temperature of the composition, between about 0.5 and about 1.6 hydroxy-reactive groups per hydroxy group contributed by the hydroxy functional polysiloxane graft copolymer.

The coating compositions of the invention can be formulated as either one component coating compositions or two component coating compositions. Typically, unblocked polyisocyanate crosslinking agent is employed in two component compositions in view of its reactivity. A composition of the invention can be formulated, for example, as a one component primer, typically employing blocked polyisocyanate or aminoplast crosslinking agent, as a one component topcoat, preferably employing aminoplast crosslinking agent, or as a two component coating, typically employing polyisocyanate crosslinking agent. Also, the graft copolymer of the invention can be formulated as a pigmented base coat, typically a one component composition, for a base coat/clear coat system such as are known for use as automotive finishes. It also can be formulated as the clear coat thereof, either as a one component or a two component composition.

Advantageously, the flexible coatings of the invention possess superior weathering properties as well as excellent adhesion to metal and plastic, thus making them well suited for use as coatings on, for example, various motor vehicle components. The ability to use the same coating composition on metal and plastic components in motor vehicle production offers distinct commercial advantages, particular in terms of production efficiency. Additionally, because thes coatings can be employed on metal as well as plastic components, the problem of color matching, which must be resolved when using different coatings on metal and plastic parts which are to be in proximity to one another, is eliminated. The siloxane moieties incorporated into the graft copolymer advantageously provide enhanced flexibility, durability and weatherability and provide lower viscosity for high solids coatings. These and additional features and advantages of the invention will be better understood in view of the following detailed disclosure.

DETAILED DESCRIPTION OF THE INVENTION

The resin of the invention is a novel, hydroxy functional polysiloxane graft copolymer of number average molecular weight ($M_n$) between about 1,000 and about 15,000, preferably between about 1,000 and about 4,000, having a hydroxyl number between about 30 and about 300, preferably between about 50 and about 150. The resin is optionally urethane-modified, more specifically, containing about 0–10 urethane linkages per molecule. Preferably, the resin contains about 0–5 urethane linkages per molecule. As disclosed above, the resin is the reaction product of carbon-carbon double bond-reactive monoethylenically unsaturated monomer with certain hydroxy functional carbon-carbon double bond-bearing branched polysiloxane macromer. Each of these reactants is discussed below in greater detail.

Carbon-Carbon Double Bond-Reactive Monoethylinically Unsaturated Monomer

Numerous carbon-carbon double bond-reactive monoethylenically unsaturated monomers suitable for making the graft copolymer are known to the skilled of the art. Included are many which are commercially available and many which will be readily apparent in view of the present disclosure. The choice of monomer reactant employed in making the graft copolymer will depend to a large extent upon the particular application intended for the resin or for the coating composition in which the resin is to be used. Examples of suitable monoethylenically unsaturated monomers include, for example, vinyl aromatic hydrocarbons such as styrene, alpha methyl styrene, and vinyl toluene, vinyl acetate, vinyl chloride, and the like.

Preferred monomers are acrylate monomers. Numerous suitable acrylate monomers are known to the skilled of the art and include many which are commercially available and which will be readily apparent in view of the present disclosure. As noted above, the choice of monomer reactant employed in preparing the resin of the invention will depend to a large extent upon the particular application intended for the resin or for the composition in which the resin is used. Suitable hydroxy-substituted alkyl(meth)acrylates (where "alkyl(meth)acrylates" means, in the alternative, alkylacrylates and alkylmethacrylates) which can be employed comprise members selected from the group consisting of the following esters of acrylic or methacrylic acid and C2–C12 aliphatic glycols: 2-hydroxy ethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxy-1-methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate. Although one of ordinary skill in the art will recognize that many different hydroxy-substituted alkyl(meth)acrylates including those listed above could be employed, the preferred hydroxy functional monomers for use in the resin of this invention are hydroxy-substituted alkyl acrylates and methacrylates having a total of 5 to 7 carbon atoms, i.e., esters of $C_2$–$C_3$ dihydric alcohols and acrylic or methacrylic acids, such as hydroxyethyl methacrylate, hydroxyethyl acrylate, hydroxypropyl methacrylate and hydroxypropyl acrylate.

Most preferably, the hydroxy-substituted alkyl(meth)acrylate monomer comprises a compound of the formula:

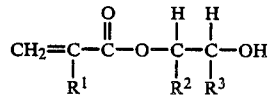

wherein $R^1$ is hydrogen or methyl and $R^2$ and $R^3$ are independently selected from the group consisting of hydrogen and alkyl of from 1 to 6 carbon atoms. Illustrative of these particularly suitable hydroxy-substituted alkyl(meth)acrylate monomers are 2-hydroxyethyl methacrylate, 2-hydroxyethyl acrylate, 2-hydroxypropyl acrylate, 2-hydroxybutyl acrylate and 2-hydroxy-1-methylhexyl acrylate.

Suitable non-hydroxy substituted alkyl(meth)acrylate monomers which may be employed are (meth)acrylates (as before, meaning esters of either acrylic or methacrylic acids) as well as mixtures of acrylates and vinyl hydrocarbons. Preferred non-hydroxy substituted monomers are esters of C1–C12 monohydric alcohols and acrylic or methacrylic acids, e.g., methylmethacrylate ethylmethacrylate, ethylacrylate propylacrylate, butylacrylate propylmethacrylate, butyl-methacrylate, hexylacrylate, 2-ethylhexylacrylate, lauryl-methacrylate, glycidyl methacrylate, and the like.

Particularly preferred non-hydroxy substituted monomers are compounds selected from the group consisting of monomers of the formula:

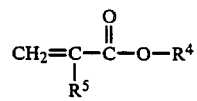

wherein $R^4$ is alkyl from 1 to 6 carbon atoms and $R^5$ is hydrogen or methyl. Particularly preferred are butyl acrylate, butyl methacrylate and methyl methacrylate.

The aforesaid monovinyl aromatic hydrocarbons, preferably containing from 8 to 12 carbon atoms, including styrene, alpha-methyl styrene, vinyl toluene, t-butyl styrene, chlorostyrene and the like, when employed, will generally be present in an amount of from about 5 to 95 weight percent, preferably from about 5 to 25 weight percent of the total monoethylenically unsaturated monomer.

In addition, other suitable monoethylenically unsaturated monomers such as vinyl chloride, acrylonitrile, methacrylonitrile, vinyl acetate, acrylic acid and methacrylic acid also may be employed. In the case of acrylic acid, when employed, this monomer will generally be present in an amount from about 2 to 5 weight percent of the total monomer mixture. The remaining above-mentioned monomers will generally be used in an amount of from 3 to 10 weight percent of the monomer mixture, when employed.

Hydroxy Functional Carbon-Carbon Double Bond-Bearing Branched Polysiloxane Macromer The hydroxy functional polysiloxane macromer is reacted with the above described monoethylenically unsaturated monomer according to any of various methods well known to the skilled of the art, which methods will be apparent in view of the present disclosure. Specifically, the macromer and the monomer are employed in a weight ratio of from about 90:10 to about 40:60, more preferably from about 75:25 to about 50:50, respectively. Preferably, all double bonds of the macromer are reacted with monomer double bonds. It will be apparent that the resulting resin will be hydroxy functional by virtue of the macromer hydroxyl groups and the monomer hydroxyl groups (if any). Suitable reaction conditions will be apparent to the skilled of the art and, generally, will include a solvent system and reaction temperature favoring free radical polymerization reaction.

The hydroxy functional polysiloxane macromer is the reaction product of any of certain epoxy acrylate with any of certain hydroxy functional polysiloxane reactants. Each of these reactants is discussed below in greater detail.

Epoxy Monomer

Epoxy monomer reactants suitable for reaction with hydroxy functional polysiloxane reactants in making the macromer of the invention are those according to the formula:

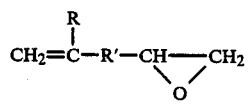

wherein R preferably is hydrogen or alkyl of 1 to about 7 carbons and R' is a hydrocarbon linking moiety, preferably alkyl or COO(CH2) n being 0 to about 7. Numerous such epoxy monomers are well known to the skilled of the art and include many which are commercially available or readily prepared according to known methods. The choice of epoxy monomer employed in preparing the macromer will depend largely upon the particular application intended for the final resin or composition comprising the resin. Preferred epoxy monomer include, for example, glycidyl acrylate, glycidyl methacrylate and a mixture thereof.

Hydroxy Functional Polysiloxane Reactant

The hydroxy functional polysiloxane reactant has a number average molecular weight ($M_n$) preferably between about 1,000 and about 12,000, more preferably between about 1,000 and about 3,000, and has a hydroxyl number preferably between about 30 and about 300, more preferably between about 50 and about 150. As discussed further below, this polysiloxane reactant preferably, but not necessarily, is urethane modified, that is, bears urethane linkages in the polysiloxane backbone. Suitable hydroxy functional polysiloxane reactants, both urethane modified and unmodified, will be apparent in view of the present disclosure and can be prepared according to known methods which also will be apparent in view of the present disclosure. The choice of polysiloxane reactant will depend to a large extent upon the particular application intended for the final resin or composition in which such resin is used.

The epoxy acrylate reactant and polysiloxane reactant are reacted together according to known methods and reaction conditions. Typically, these two reactants are employed in molar ratio of from about 2:1 to about 1:2, more preferably about 1:1. More generally, the epoxy acrylate is used in an amount insufficient to yield a gelled reaction product. Also, the epoxy acrylate reactant is used in an amount insufficient to react with all of the hydroxy functionality of the polysiloxane, since the reaction product, the branched polysiloxane macromer, must have hydroxy functionality to react with the crosslinking agent during cure. In preparing the macromer a catalyst should be employed for the reaction between the epoxy functionality of the epoxy acrylate and the hydroxy functionality of the polysiloxane. Suitable catalysts for this reaction are known and include commercially available catalysts, such as sulfonic acid catalyst, for example CG 21-746 (trademark) available from Ciba Geigy Corp., Ardsley, N.Y., and phosphine catalyst, for example Shell 1201 (trademark; Shell Chemical Co.). Additional suitable catalysts will be apparent in view of the present disclosure. It is also preferred to employ an agent to inhibit polymerization reaction of the carbon-carbon double bonds of the epoxy acrylate reactant. Suitable inhibiting agents are well known and include, for example, hydroquinone and others which will be apparent in view of this disclosure.

One suitable class of polysiloxane reactants comprises the reaction products of first reactant comprising polyol with second reactant comprising certain alkoxy silicone and, optionally, dicarboxylic acid or an anhydride thereof. Where the graft copolymer is to be employed in a high solids coating for motor vehicle exterior body panels, for example, such second reactant preferably comprises about 5%-35% by weight alkoxy silicone and the remainder dicarboxylic acid or anhydride; more preferably the second reactant comprises about 5%-15% alkoxy silicone. Obviously, where the second reactant comprises dicarboxylic acid ar anhydride, the reaction product of the second reactant with polyol will contan polyester linkages as well as polysiloxane linkages. Herein, such reaction product will be referred to simply as polysiloxane regardless whether it has such polyester linkages. The alkoxy silicone can be reacted with polyol either simultaneously with the dicarboxylic acid or sequentially (in either order) and the alkoxy silicone and diacid also can be reacted with separate portions of the polyol. Most preferably the polysiloxane is an oligomeric polysiloxane.

Preferably, the diacid is selected from the group consisting of saturated and unsaturated, cyclic and acyclic aliphatic dicarboxylic acids, aromatic dicarboxylic acids, and suitable anhydrides thereof. Preferred dicarboxylic acids are the $C_6$–$C_{36}$ acids, which include, for example, adipic, azelaic, sebasic, dodecane dicarboxylic acid, cyclohexanedicarboxylic acid and dimer acids. More preferably, the dicarboxylic acids employed are aliphatic dicarboxylic acids, most preferably additionally being linear, for example, adipic, azelaic, dimer, and dodecanoic. Also suitable for use are blocked dicarboxylic acids such as dimethyl-1,4-cyclohexanedicarboxylate. Mixtures of suitable diacids and/or their anhydrides may also be used as the dicarboxylic acid component in this invention.

Numerous suitable alkoxy silicones for use in making the hydroxy functional polysiloxane reactant are known to the skilled of the art and will be readily apparent in view of the present disclosure. Included are many commercially available alkoxy silicones and others which can be readily prepared according to known methods. Preferred alkoxy silicones have number average molecular weight between about 350 and about 10,000, more preferably between about 350 and about 1000. Preferred are those of the general formula:

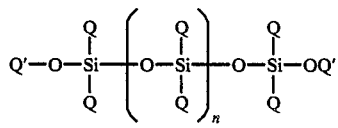

wherein each Q is independently selected from hydrogen, alkyl, alkoxy, aryl, aryloxy and the like, each alkyl moiety preferably being $C_1$ to $C_7$ and each arly moiety preferably being $C_6$–$C_8$; each Q' is independently selected from alkyl, preferably $C_1$ to $C_7$ alkyl; and n is 1 to about 75, preferably about 1 to about 25. Preferred alkoxy silicones include certain commercially available products such as, for example, alkoxy silicone SR 191 (trademark; General Electric Company, Waterford, N.Y.) which is a 100% silicone resin having siloxane content of 88.9%, methoxy content of 15%, and number average molecular weight of 600. Another suitable alkoxy silicone is SR-193 (trademark; General Electric Company), which is similar to SR-191, but contains certain silicone modifying agents and produces a somewhat more brittle product. Also suitable is Silikophen P50/300 (trademark; available from Goldschmidt Chemical Corp., Hopewell, Va.) a phenyl methyl polysiloxane resin in a xylene/2-methoxypropanol-1-solvent. Also suitable is Wacker Silicone-Intermediate SY-231 (trademark; Wacker-Chemie GmbH, Munich, Germany) which is taught for use in preparing polyesters and coating compositions and has an average molecular weight of 800, methoxy content of 14 weight percent, total silicone content of 89 weight percent (all methoxy groups replaced by Si—O—Si bonds) and $SiO_2$ content of 44 weight percent gravimetric. Mixtures of alkoxy silcones also may be used in reaction with the polyol reactant to prepare the hydroxy functional polysiloxane reactant.

Numerous suitable polyols for making the hydroxy functional polysiloxane reactant are known to the skilled of the art and will be readily apparent in view of the present dislcosure. Included are many commercially available polyols and others which are readily prepared according to known methods. Preferably, the polyol comprises diol and triol in hydroxyl equivalent ratio of from about 4:1 to about 1:4, more preferably from about 3:1 to about 3:2.5, respectively. Suitable diols include, but are not limited to, alkylene glycols, such as butylene glycol, neopentyl glycol, 1,5-pentene glycol, 3-cyclohexene-1,1-dimethylol, and other glycols such as hydrogenated bisphenol A, caprolactone diol (e.g., the reaction product of caprolactone and ethylene glycol), hydroxy alkylated bisphenol, polyether glycols, e.g., poly(oxytetramethylene)glycol, polyester diols, e.g., 2,2-dimethyl-3-hydroxypropyl-2,2-dimethyl-3-hydroxypropionate, and the like. Preferred diols are neopentyl glycol and 2,2-dimethyl-3-hydroxypropyl-2,2-dimethyl-3-hydroxypropionate, the latter material being commercially available as Esterdiol 204 (trademark; Union Carbide Corp., Danbury, Conn.)

The polyol generally should comprise at least about 5 weight percent triol and may consist substantially entirely of triol. The polyol component also may comprise tetrols and higher functionality polyols, but these generally are less preferred. By employing diols in the polyol component in addition to the triols, the flexibility of the coating composition is generally increased. Thus, selection of the polyol component to be used in forming the polysiloxane will be dependent on the particular desired properties and application of the coating composition. When diols are employed in the polyol component, the polyol preferably comprises from about 10 to about 80 weight percent triols and from about 90 to about 20 weight percent diols. Preferred triols are conventional low molecular triols such as 1,2,6-hexanetriol, 1,1,1-trimethylolpropane, 3-(2-hydroxypropoxy)-1,2-propanediol and polycaprolactone triols, which are commercially available as, for example, Tone-301 (trademark; Union Carbide Corp., Danbury, Conn.). Additional preferred polycaprolactone triols are described in U.S. Pat. No. 4,165,345, incorporated herein by reference. Suitable tetrols will be apparent also and include, for example, pentaerythritol and the like.

While a number of types of polyols have been mentioned above as suitable for use in making the hydroxy functional polysiloxane reactant, their disclosure is not meant to be limiting. A great many additional suitable diols, triols, etc. are known in the art and selection of other polyols which would be suitable for use would be well within the skill of those in the art in view of this disclosure.

The polyol reactant (i.e., diols, triols and optionally tetrols, etc.) and the second reactant (i.e., alkoxy silicone and, optionally, dicarboxylic acid or anhydride thereof) are combined and reacted, generally in the presence of a catalyst and at elevated temperatures, to produce the aforesaid hydroxy functional polysiloxane. Suitable catalysts for the carboxy/hydroxy condensation reaction include such catalysts as tetraisopropyl titanate, strong acids such as p-toluene phosphonic acid, phosphoric acid, sulfuric acid and materials such as zinc oxide, antimony oxide ($Sb_2O_3$), dibutyl tin oxide, hydrated monobutyl tin oxide, and sodium acetate. Other catalysts will be apparent to those skilled in the art in view of this disclosure. The polyol and second reactant are reacted preferably in such proportions as to provide a molar equivalent ratio of polyol OH to combined alkoxy silicone —OQ' (as defined above) and diacid COOH from about 6:2 to about 6:5, respectively. Sufficient polyol must be used to provide a hydroxy functional product.

As noted above, the hydroxy functional polysiloxane is optionally urethane modified and typically may contain about 1–10 urethane groups per molecule. According to one embodiment of the invention, urethane groups are introduced by reaction of the above-described hydroxy functional polysiloxane with organic diisocyanate. Such reaction is carried out according to known methods, generally in the presence of solvents commonly employed for coating formulations such as toluene, xylene, methyl amyl ketone, and the like. Numerous suitable organic diisocyanates are readily commercially available and will be apparent to the skilled of the art in view of the present disclosure. Suitable diisocyanates include hydrocarbon diisocyanate or substituted hydrocarbon diisocyanate, such as 1,6-hexamethylene diisocyanate, isophorone diisocyanate, p-phenylene diisocyanate, biphenyl diisocyanate, toluene diisocyanate, and 3,3-dimethyl-4,4-biphenylene diisocyanate. While the diisocyanate may be any of a number of aliphatic, cycloaliphatic, and aromatic diisocyanates, it is preferred that the diisocyanate be an aliphatic diisocyanate, such as 4,4-dicyclohexylmethanediisocyanate. As would be apparent to those skilled in the art, mixtures of various diisocyanates may also be employed as the diisocyanate component used in forming urethane-modified polysiloxane. Typically, the hydroxy functional polysiloxane and diisocyanate are reacted in such proportions as to provide about 4–10 hydroxyl groups per isocyanate group.

Urethane linkages are introduced to the hydroxy functional graft copolymer by reacting the hydroxy functional oligomeric polysiloxane reactant of the macromer with an organic polyisocyanate to form a hydroxy functional oligomeric polysiloxane reactant containing urethane linkages which then is reacted with glycidylmethacrylate to form the macromer.

While urethane modification may be introduced in the manner discussed above, according to an alternative embodiment of the invention the polyol reactant employed in reaction with the second reactant comprises urethane modified polyol. In this case, there is no need to react with diisocyanate the hydroxy functional polysiloxane. Employing urethane modified polyol is found to provide a final resin, i.e., graft copolymer, which is somewhat more flexible than when the urethane groups are introduced by reaction of the hydroxy functional polysiloxane with diisocyanate. Suitable urethane modified polyols are commercially available or readily prepared according to known methods. Exemplary urethane modified diols are made by reaction of diol and diisocyanate in a molar ratio of from about 4:1 to about 4:3, preferably from about 2:0.8 to about 2:1.2, more preferably about 2:1. Suitable diols and diisocyanates include those mentioned above. Such ratio of diol to diisocyanate (i.e., a molar excess of diol) causes the reaction product to be substantially free of unreacted isocyanate groups. This urethane modified diol is then combined with other portions of the polyol reactant (e.g., additional diol, triol, tetrol, etc.) for reaction with the second reactant, generally at elevated temperature and in the presence of a catalyst (as discussed above) to produce the hydroxy functional polysiloxane, specifically, a hydroxy functional urethane modified polysiloxane. It will be apparent to those skilled in the art, that urethane modified triol, urethane modified tetrols, etc. can be used in addition to or in lieu of urethane modified diol, according to the methods and guidelines discussed above, to provide hydroxy functional urethane modified polysiloxane.

Coating Compositions

According to another aspect of the invention, the above-described hydroxy functional polysiloxane graft copolymer is employed in an organic solvent based thermosetting coating composition together with suitable polyfunctional hydroxy-reactive crosslinking agent. Such crosslinking agent is selected, preferably, from aminoplast crosslinking agents and polyisocyanate crosslinking agents, either blocked or unblocked depending upon the intended application. Coating compositions of the invention can be formulated so as to be suitable for numerous different applications including, particularly, as motor vehicle body panel coatings. Thus, for example, a coating composition of the invention can be formulated as a primer or as a topcoat, such as a basecoat for a basecoat/clearcoat system, a clearcoat for a basecoat/clearcoat system, or as a one-coating topcoat. Moreover, any of these coatings can be formulated as either a one-component (i.e., resin and crosslinker combined) or a two-component (i.e., resin and crosslinker segregated) coating composition, except that the basecoat of a base/clear system generally would be formulated only as a one-component coating in view of the high pigment content thereof and the mixing and dispersion problems which would result in attempting to add the crosslinking agent at the time of application to a substrate. It is, of course, well known to the skilled of the art to employ unblocked polyisocyanate crosslinking agents generally only in two-component formulations to prevent premature reaction thereof with the hydroxy functional copolymer. Blocked polyisocyanate crosslinkers are employed in one-component coatings, but typically these are employed in primers since the two-component unblocked polyisocyanate coatings of the invention are found generally to provide better surface appearance. The amino resin crosslinking agents also are employed, typically, in one component formulations.

In a coating composition intended for use as a high solids base coat or clear coat of a base/clear automotive coating formulation, typically it is preferred that the graft copolymer have a number average molecular weight ($M_n$) between about 1,500 and about 3,000, more preferably between about 1,500 and about 2,500. Also, for such use the resin preferably has a hydroxy number between about 50 and about 150.

A solvent based high solids enamel coating composition is formed from a hydroxy functional polysiloxane graft copolymer having a number average molecular weight about 1,000–4,000, a hydroxyl number between about 50 and about 150 and about 1–10 urethane linkages per molecule, and is the reaction product of carbon-carbon double bond-reactive monoethylenically unsaturated monomer with carbon-carbon double bond-bearing branched polysiloxane macromer under free radical polymerization reaction conditions, the monomer bears substantially no functionality which is substantially reactive with hydroxy functionality of the macromer under the reaction conditions; the macromer is the reaction product of glycidyl methacrylate with hydroxy functional oligomeric polysiloxane reactant that has a molecular weight between about 1,000–3,000 and a hydroxyl number between about 30–300; and an alkylated melamine crosslinking agent.

The above oligomer polysiloxane is urethane modified and is the reaction product of organic diisocyanate with the reaction product of (i) polyol of at least about 5 percent by weight triol with (ii) second reactant selected from dicarboxylic acid and alkoxy silicone, at least a portion of the second reactant is an alkoxy silicone. The alkoxy silicone has a number average molecular weight between about 350 and about 1,000 and has the general formula:

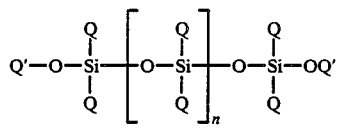

wherein each Q is from the group of hydrogen, alkyl, alkoxy, aryl and aryloxy; each Q' is alkyl; and n is 1 to about 75; the alkoxy silicone formula variable n has a value of from 1 to about 25.

One useful alkoxy silicone siloxane content of about 89%, methoxy content of about 15%, and number average molecular weight of about 600.

The dicarboxylic acid used to form the above oligomer polysiloxane is from the group of saturated and unsaturated, cyclic and acyclic aliphatic dicarboxylic acids, aromatic dicarboxylic acids, suitable anhydrides thereof, and any mixture thereof. The dicarboxylic acid preferably is a saturated, acyclic, aliphatic dimer acids of about 6–36 carbons and is from the group of adipic acid, azelaic acid, sebasic acid, dodecane dicarboxylic acid and any mixture thereof.

The polyol used to form the above oligomer polysiloxane preferably is a mixture of a diol and triol in hydroxy equivalent ratio of from about 4:1 to about 1:4. The diol has molecular weight of about 60–500 and is from the group of trimethylene glycol, triethylene glycol, 1,4-cyclohexane dimethanol, alky substituted or unsubstituted propanediol, butanediol, pentanediol and hexanediol, and any mixture thereof. The triol is from the group of trimethylol propane, polycaprolactone triol, and any mixture thereof.

The organic iisocyanate used to form the above oligomer polysiloxane is from the group of phenylene diisocyanate, biphenyl diisocyanate, toleune diisocyanate, isophorone diisocyanate, 3,3'-diemthyl-4,4'biphenylene diisocyanate, diisocyanatoalkane wherein the alkane moiety has about three to about ten carbons, and any mixtures thereof.

Crosslinking Agent

The crosslinking agent is generally included in compositions of the invention in an amount between about 5 and about 60 weight percent, preferably in an amount between about 20 and about 50 weight percent based on the weight of the copolymer and crosslinker combined. Selection of the optimal amount of crosslinking agent to be employed in the coating composition is dependent on the desired properties (e.g., flexibility) of the coating as well as its intended use, and selection of such amount would be within the skill of one in the art.

Polyisocyanate crosslinking agents are well known in the art and numerous suitable organic isocyanates having 2 or more reactive isocyanate groups per molecule will be apparent to those skilled in the art. Among the many suitable polyisocyanates are aliphatic, cycloaliphatic and aromatic isocyanate compounds. Representative of the numerous isocyanates which can be employed are (1) aliphatic diisocyanates such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate, butylidene diisocyanate, 4,4'-bis(isocyanate hexyl)methane, bis(2-isocyanate-ethyl)fumarate, 2,6-diisocyanate methyl caproate, 2,2,4-(2,4,4)-trimethylhexamethylene diisocyanate, and dimer acid diisocyanates; (2) cycloaliphatic diisocyanates such as 1,3-cyclopentane diisocyanate, 1,4-cyclopentane diisocyanate, 1,2-cyclopentane diisocyanate, and methylcyclohexylene diisocyanate; (3) aromatic diisocyanates such as m-phenylene diisocyanate, p-phenylenediisocyanate, 4,4'-diphenyl diisocyanate; (4) aliphatic/aromatic diisocyanates such as 4,4'-diphenylene methane diisocyanates, 2,4- or 2,6-tolylene diisocyanate, 4,4'-toluidene diisocyanate, 1,4-xylylene diisocyanate; (5) nuclear substituted aromatic compounds such as dianisidine diisocyanate, 4,4'-diphenylether diisocyanate, chlorodiphenylene diisocyanate; (6) triisocyanates such as triphenylmethane-4,4',4"-triisocyanate, 1,3,5-triisocyanate benzene, 2,4,6-triisocyanate toluene; (7) tetraisocyanates such as 4,4'-diphenyl dimethylmethane 2,2',5,5'-tetraisocyanate; (8) polymerized isocyanates such as tolylene diisocyanate dimers and trimers and the like; and (9) polyisocyanates such as prepolymers derived from a polyol, including polyether polyols or polyester polyols (including polyethers which are reacted with excess polyisocyanates to form isocyanate terminated prepolymers), simple polyols such as glyols (e.g., ethylene glycol, propylene glycol), other polyols such as glycerol, trimethylol propane, hexane triols, pentaerythritol and the like, as well as monomers, e.g., diethylene glycol, tripropylene glycol and the like, and polyethers, i.e., alkylene oxide condensates of the above. While the polyisocyanate crosslinking agent may be any organic polyisocyanate as has been noted above, such crosslinking agent for coating composition to be employed as clear (top) coats are preferably aliphatic and cycloaliphatic polyisocyanates, due to their superior weatherability.

Especially preferred for use in clearcoat compositions of the invention are trimerized products of aliphatic diisocyanates such as 1,6-hexamethylene diisocyanate. Still another particularly preferred type of crosslinking agent is a polyisocyanate having a biuret structure. This type of polyisocyanate is well known, as are methods for making the same. Suitable such polyisocyanate crosslinking agents are high molecular weight biurets of 1,6-hexamethylene diisocyanate sold by Mobay Chemical Company under the trademarks Desmodur N and Desmodure L-2291. Exemplary of other biuret type polyisocyanates are those prepared in accordance with U.S. Pat. No. 3,976,622 to Wagner et al.

Blocked polyisocyanate crosslinking agents are well known to the skilled of the art and many suitable for use in compositions of the invention are commercially available or readily prepared and will be apparent from the present disclosure. More specifically, blocked polyisocyanate crosslinking agents comprise the reaction product of a polyisocyanate, such as those mentioned above, with a blocking agent, that is, an active hydrogen-bearing reactant. Exemplary blocked polyisocyanates are described, for example, in U.S. Pat. No. 4,497,938, which description is incorporated herein by reference. Blocked polyisocyanate crosslinking agents are used generally in the same proportions disclosed above for unblocked polyisocyanate crosslinking agents.

Amine-aldehyde crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents are amine-aldehyde resins such as condensation products of formaldehyde with melamine, substituted melamine, urea, benzoguanamine or substituted benzoguanamine. Preferred members of this class are methylated melamine-formaldehyde resins such as hexamethoxymethylmelamine. Particularly preferred crosslinkers are the high solids melamine resins which have substantially 95+ percent nonvolatile content. For so-called "high solids" compositions of this invention, it should be recognized that it is important not to introduce extraneous diluents that lower the final solids content of the coating. Other suitable amine-aldehyde crosslinking agents will be apparent to one skilled in the art. Amine-aldehyde crosslinking agents are preferred for basecoat compositions of the invention. The amine-aldehyde crosslinking agent is generally included in a basecoat composition in an amount of between about 5 and about 60, preferably between about 20 and about 40 weight percent. However, selection of the particular amount of amine-aldehyde crosslinking agent to be employed in any such composition is dependent on the desired properties of the composition as well as its intended use and would be apparent to one skilled in the art.

Particular preferred crosslinking agents are the amino crosslinking agents sold by American Cyanamid under the trademark "Cymel". In particular, Cymel 301, 303, 325, 1130, 1156, 1161 and 1168 (trademarks) are alkalated melamine aldehyde resins useful in the compositions of this invention. The crosslinking reactions are catalytically accelerated by acids. One such catalyst, for example, which may be so employed is p-toluene sulfonic acid, which when employed is generally added to the composition in about 0.5% by weight based on the total weight of the graft copolymer and crosslinking agent.

Additional Materials

Additional materials which may be employed in the coating compositions of this invention include a high molecular weight linear polyurethane which has a number average molecular weight of between about 15,000 and about 40,000, preferably between about 20,000 and about 30,000. It may be made by reacting one of the above mentioned diisocyanates and diols, such as oligo-ester diol, polycaprolactone diol, polyoxypropylene diol, polyether diols, etc. Suitable high molecular weight linear polyurethane materials are commercially available, for example, as Spenlite L06-30S, (trademark, Spencer-Kellogg, Buffalo, N.Y.). It has been found that these high molecular weight polyurethanes may be employed in metallic flake pigment-bearing topcoat compositions in small amounts, typically up to about 15 weight percent based on the total weight of the polyester graft copolymer and crosslinking agent, to improve the orientation of the metallic flake pigment in the cured coating. It has been found that by including such linear polyurethane, for example, in a basecoat of a basecoat/clearcoat system, the depth of color and metallic glamour of the system may be improved.

Other materials which may be included in the coating compositions of this invention include, for example, catalysts, antioxidants, U.V. absorbers (for topcoats), solvents, surface modifiers and whitening agents. Solvents used in the coating composition of this invention are those which are commonly used, e.g., to facilitate spray application and high solids content and include toluene, xylene, methylethyl ketone, acetone, 2-ethoxy-1-ethanol, diacetone alcohol, tetrahydrofuran, ethyl acetate, dimethylsuccinate, dimethylglutarate, dimethyladipate and mixtures thereof. The solvent in which the polysiloxane graft copolymer is prepared may be employed as a solvent for the composition, thus eliminating the need for drying the resin after preparation, if such is desired.

Typical ultraviolet light stabilizers that are useful in topcoat compositions of this invention are benzophenones such as dodecyl oxibenzophenone, 2,4-dihydroxybenzophenone, hydroxybenzophenones containing sulfonic groups, 2,4-dihydroxy-3',5'-ditertiarybutylbenzophenone, 2,2',4'-trihydroxybenzopheone esters of dicarboxylic acids, 2-hydroxy-4-acryloxyethoxybenzophenone, aliphatic monoesters of 2,2',4-trihydroxy-4'-alkoxybenzophenone, 2-hydroxy-4-methoxy-2-carboxybenzophenone, triazoles such as 2-phenyl-4-(2'4'-dihydroxybenzolyl)-triazoles, substituted benzotriazoles such as hydroxyphenyltriazoles such as 2-(2'-hydroxy-5'-methylphenyl)benzotriazole, 2-(2'-hydroxyphenyl)-benzotriazole, and 2-(2'-hydroxy-5'-octylphenyl)naphthiotriazole.

Another type of ultraviolet light stabilizer and one that is particularly preferred for use in the coatings of this invention is that taught in U.S. Pat. No. 4,480,084 entitled "Polymeric Light Stabilizers" to Kordomenos et al. These stabilizers contain the sterically hindered polyalkylpiperidine radical and at least two primary hydroxyl groups available for reacting with the crosslinking agent, e.g., amine-aldehyde or polyisocyanate, of the coating composition.

Typical antioxidants which may be employed in the coating composition include tetrakis alkylene (di-alkyl hydroxy aryl) alkyl ester alkanes such as tetrakis methylene 3-(3',5'-di-tert-butyl-4'-hydroxyphenyl)propionate methane (available under the trademark Irganox 1010 from Ciba-Geigy Corp.). Also suitable are the reaction product of p-amino diphenylamine and glycidyl methacrylate, the reaction product of n-hexyl-N'-phenyl-p-phenylene diamine and glycidyl methacrylate, pentaerythritol tetrakis(thioglycolate), trimethylol propane tris(thioglycolate), trimethylol ethane tris(thioglycoate), N-(4-anilinophenyl)maleimide, alkylhydroxyphenyl groups bonded through carboalkoxy linkages to nitrogen atom of a heterocyclic nucleus containing an imidodicarbonyl group or an imidodithiocarbonyl group, 3,3-ditertbutyl-4-hydroxy-cinnamonitrile, ethyl 3,5-diterthexyl-4-hydroxy-cinnamate, substituted benzyl esters of beta-substituted (hydroxyphenyl)-propionic acids, bis-(hydroxyphenylalkylene)alkyl isocyanurate compounds, tetrakis hydroxy benzyl phosphonium halides alone or in combination with a dialkylthiodialkanoate, thiodimethylidyne tetrakisphenols alone or in combination with a dialkyl thiodialkanoate or phosphite or phosphonate, dihydrocarbyl-hydroxyphenyl aryl or alkyl phosphonites or phosphonates or phosphates or phosphinites or phosphinates or phosphionites or phosphorothionates or phosphinothionates, diphenyl-bis(3,5-ditertbutyl-4-hydroxyphenoxy)silane, hydrocarbylhydroxyphenyl-dihydrocarbyldithio-carbamates such as 3,5-ditertbutyl-4-hydroxyphenyl dimethyldithiocarbamate and amino benzyl thioether.

In one preferred embodiment a base/clear topcoat system is provided, wherein both the basecoat and the clearcoat comprise a resin and crosslinker composition according to the invention. The basecoat would preferably contain only a benzotriazole U.V. stabilizer such as Tinuvin 328 (trademark, Ciba-Geigy, Ardsley, N.Y.), and the clearcoat would contain a benzotriazole U.V. stabilizer, e.g., Tinuvin 328, the polymeric hindered amine light stabilizer of the aforementioned U.S. Pat. No. 4,480,084 to Kordomenos et al and an antioxidant, e.g., Irganox-1010 (trademark; Ciba-Geigy). While preferred combinations of stabilizers and antioxidants have been described, these teachings are not meant to be limiting. Selection of suitable stabilizers and antioxidants is within the skill of one in the art.

Surface modifiers or wetting agents are common additives for liquid paint compositions. The exact mode of operation of these surface modifiers is not known, but it is thought that their presence contributes to better adhesion of coating compositions to the surface being coated and helps formulation of thin coatings, particularly on metal surfaces. The choice of surface modifiers or wetting agents is dependent upon the type(s) of surface to be coated. Selection of appropriate surface modifiers is well within the skill of the art. Typical of these surface modifiers are polybutyl acrylate and a wide variety of silicon wetting agents which are commercially available.

For many applications of the coating compositions of the invention, particularly high solids compositions, it may be desirable to employ flow control additives to provide sag free coatings. Among the many such materials which are known are non-aqueous dispersions (NAD's) such as described by Porter (S. Porter, Jr., and B. N. McBane, U.S. Pat. No. 4,025,474, May 24, 1977). These particle dispersions may be included generally in an amount up to 15% by weight of the total composition. Other types of NAD's such as described by D. L. Maker and S. C. Peng (U.S. Pat. No. 3,814,721, June 4, 1974) or by S. K. Horvath (U.S. application Ser. No. 292,853, filed Aug. 14, 1981, now U.S. Pat. No. 4,415,681) also may be included in the coating compositions.

Coating compositions according to certain embodiments of the invention may contain pigments. Thus, for example, primer compositions and the basecoat of a base/clear system may comprise any of the wide variety of suitable pigments which are known to the art and readily commercially available. Selection of suitable pigments and the amounts of same will depend largely on the intended use and desired properties of the coating, for example, desired color, hiding properties, etc., and is within the skill of those in the art.

The coating composition can be applied by conventional methods known to those in the art. These methods include roll coating, spray coating, dipping or brushing. The particular application technique chosen will depend upon the particular substrate to be coated and the environment in which the coating operation takes place. Preferred techniques for applying these coating compositions, particularly when applying the same to automobiles, is spray coating through the nozzle of the spray gun. A basecoat, for example, can be applied as a single component by means of a single component spray gun. On the other hand, in spraying applying a two component clearcoat composition, the polysiloxane graft copolymer and additives such as pigments, U.V. absorbers, antioxidants and other nonreactive materials are admixed with a solvent. These materials are fed as one component of a two component system into a spray gun which combines the materials as they are sprayed into the automotive substrate. The other material is the polyisocyanate crosslinking agent, which may or may not be cut with a suitable nonreactive solvent.

The invention will be further understood by referring to the following detailed examples. It should be understood that the specific examples are presented by way of illustration and not by way of limitation. Unless otherwise specified, all references to "parts" are intended to mean parts by weight.

EXAMPLE I

Hydroxy functional oligomeric polysiloxane reactant was prepared according to this example. In a suitable reactor 1836 g Esterdiol-204 (trademark; Union Carbide, Danbury, Conn.; 2,2-dimethyl-3-hydroxypropyl-2,2-dimethyl-3-hydroxypropionate), 552 g trimethylolpropane, 1314 g adipic acid, and 190 g SR-191 (trademark; General Electric Co.; methoxy functional silicone resin) were charged. The mixture was heated to 300° F. and a mixture of water and methanol was distilled off until the acid number dropped below 10. The batch was then thinned with 1535 g xylene. The final product had a viscosity of K at 70% non-volatiles.

EXAMPLE II

Hydroxy functional oligomeric polysiloxane reactant was prepared according to this example. In a suitable reactor 300 g triethylene glycol, 300 g SR-191 (trademark; General Electric) and 1.1 g Ken-Kem TIPT (trademark; Kenrich Petrochemical, Inc.; titanium catalyst) was charged. The mixture was heated at 300° F. until 85% of the total theoretical methanol was evolved. At this point the batch was thinned with 200 g Solvesso 100 to yield a resin with an A viscosity at 72% non-volatiles.

EXAMPLE III

Hydroxy functional oligomeric polysiloxane reactant was prepared according to this example. In a suitable reactor 400 g Solvesso 100, 300 g triethylene glycol, and 2.2 g Ken-Kem TIPT (trademark; Kenrich Petrochemical, Inc.; titanium catalyst) were charged. The mixture was heated to 250° F. at which time 194 g alkoxy silicone SR-193 (trademark; General Electric Co.) was added dropwise. After addition was complete, the mixture was heated at 250° F. until approximately 50% of the theoretical methanol was evolved. The reaction mixture was cooled to 200° F. and 146 g adipic acid and 88 g trimethylol propane were charged. The mixture was heated at 300° F. and water was distilled off until the acid number dropped below 10. The final product had a viscosity of A at 55% non-volatiles and an acid number of 9.

EXAMPLE IV

Hydroxy functional oligomeric polysiloxane reactant was prepared according to this example. In a suitable reactor 1530 g Esterdiol 204 (trademark; Union Carbide Corp.; diol), 1095 g adipic acid, 660 g trimethylolpropane, and 3 g Fascat 4100 (trademark; M&T Chemicals, Inc.; catalyst) were charged. The mixture was heated at 300°-340° F. and water distilled off until the acid number dropped below 10. At this point the batch was thinned with 1300 xylene to yield a resin with a viscosity of R at 70% non-volatiles and an acid number of 4. Subsequently, such product resin (1000 g) was charged into a suitable reactor together with 49 g alkoxy silicone SR-191 (trademark; General Electric Co.), and 3.5 g benzoic acid. The mixture was heated at 225° F. until 75% of the total theoretical methanol was evolved. The resulting resin had a viscosity of L at 68% non-volatiles.

EXAMPLE V

Hydroxy functional polysiloxane reactant was prepared according to this example. In a suitable reactor 425 g of the resin from Example II, 73 g adipic acid, and 44 g trimethylol propane were charged. The mixture was heated at 300° F. and water was distilled off until the acid number dropped below 5. The final product had a viscosity of D-E at 77% non-volatiles.

EXAMPLE VI

Hydroxy functional carbon-carbon double bond-bearing branched polysiloxane macromer was prepared according to this example. In a suitable reactor 1085 g of the resin from Example I, 911 g xylene, and 4.13 g Shell 1201 (trademark; Shell Chemical Co.) catalyst were charged. The mixture was heated to 200° F. and 53.6 g glycidyl methacrylate was added dropwise at such rate that addition was complete in 20 minutes. At this point 83 mg hydroquinone was added and the mixture was further heated at 200° F. until the weight per epoxy (WEP) of the product resin was above 2000. The final resin had a viscosity less than A at 36% non-volatiles.

EXAMPLE VII

Hydroxy functional polysiloxane reactant was prepared according to this example. In a suitable reactor 400 g of the resin from Example II, 40 g trimethylol propane, 131 g adipic acid, and 0.6 g Fascat 4100 (trademark; M&T chemicals, Inc.; catalyst) were charged. The mixture was heated at 300° F. and water was distilled off until the acid number dropped below 10. The resulting resin had a W viscosity at 92% non-volatiles.

EXAMPLE VIII

Hydroxy functional carbon-carbon double bond-bearing branched polysiloxane macromer was prepared according to this example. In a suitable reactor 800 g of the resin from Example III, 0.4 g Shell 1201 (trademark; Shell Chemical Co.) catalyst, 50 mg hydroquinone, and 800 g xylene were charged. The mixture was heated at 200° F. and 34 g glycidyl methacrylate were added dropwise over a period of 10 minutes. After addition was complete, the mixture was further heated at 200° F. until the WPE was greater than 2000. The resulting resin had an A viscosity at 53% non-volatiles.

EXAMPLE IX

Hydroxy functional carbon-carbon double bond-bearing branched polysiloxane macromer was prepared according to this example. In a suitable reactor 500 g of the resin of Example V, 0.31 g Shell 1201 (trademark; Shell Chemical Co.) catalyst, 40 mg hydroquinone, and 630 g xylene were charged. This mixture was heated to 200° F. at which time 27 g glycidyl methacrylate was added dropwise at such a rate that addition was complete in 40 minutes. The mixture was further heated at 200° F. until the WPE rose above 2000. The resulting resin had an A viscosity at 31% non-volatiles.

EXAMPLE X

Hydroxy function polysiloxane graft copolymer was prepared according to this example. In a suitable reactor 440 g xylene and 7.2 g cumene hydroperoxide were charged. This mixture was heated to 280° F. and a mixture of 1784 g of the resin from Example VI, 242 g butyl methacrylate, 24 g hydroxyethyl acrylate, 50 g styrene, 12 g acrylic acid, and 7.2 g t-butylperbenzoate was added dropwise over a period of five hours. The mixture was postreacted at 280° F. for two hours. The temperature was raised to 300° F. and 880 g of xylene were stripped off. The final produce had a viscosity of F at 62% non-volatiles.

EXAMPLE XI

Hydroxy functional carbon-carbon double bond-bearing branched polysiloxane macromer was prepared according to this example. In a suitable reactor 400 g of the resin from Example VII, 0.3 g Shell 1201 (trademark; Shell Chemical Co.) catalyst, 40 mg hydroquinone, and 599 g xylene were charged. The mixture was heated to 200° F. at which time 26 g glycidyl methacrylate was added dropwise over a period of one hour. The mixture was further heated at 200° F. until the WPE rose above 2000. The resulting resin had a viscosity of A at 47% non-volatiles.

EXAMPLE XII

Hydroxy functional polysiloxane graft copolymer was prepared according to this example. In a suitable reactor 375 g xylene and 5.6 g cumene hydroperoxide were charged. The temperature was raised to 270° F. and a mixture of 1500 g of the resin from Example VIII, 207 g butyl methacrylate, 20 g hydroxypropyl methacrylate, 43 g styrene, and 5.6 g t-butylperbenzoate was added dropwise over a period of five hours. The mixture was postreacted at 275° F. for two hours. The temperature was raised to 300° F. and 1080 g of xylene were stripped off. The final product had a viscosity of F at 67% non-volatiles.

EXAMPLE XIII

Hydroxy functional polysiloxane graft copolymer was prepared according to this example. In a suitable reactor 218 g of xylene and 3.6 g cumene hydroperoxide were charged. The mixture was heated to 270° F. at which time a mixture of 900 g of the resin from Example IX, 120 g butyl methacrylate ("BMA"), 12 g hydroxypropyl methacrylate ("HPMA"), 25 g styrene, and 3.6 g t-butylperbenzoate were added. The mixture was post-reacted at 270° F. for two hours. The temperature was raised to 300° F. and 544 g xylene were stripped off. The final product had a K viscosity at 64% non-volatiles.

EXAMPLE XIV

Hydroxy functional polysiloxane graft copolymer was prepared according to this example. In a suitable reactor 330 g of xylene and 5 g cumene hydroperoxide were charged. The mixture was heated to 270° F. and a mixture of 900 g of the resin from Example XI, 182 g butyl methacrylate, 18 g hydroxypropylmethacrylate, 38 g styrene, and 5 g t-butylperbenzoate was added over a period of five hours. The mixture was postreacted for two hours at 270° F. The temperature was raised to 300° F. and 680 g of xylene were stripped off. The final product had a viscosity of R at 70% non-volatiles.

EXAMPLES XV-XXI

One and two component flexible clear coat compositions ("flexible" referring to the cured coating) suitable for use in a base/clear automotive coating system were formulated according to the compositions in Table A. The order of addition was as follows. In the case of one component coatings formulated with Cymel 1130 (trademark; American Cyanamid Co.; alkylated melamine crosslinking agent), the resin was mixed with n-butylacetate, a UV-stabilizer/absorber package (a solution of 25 parts TIN 079L, 8 parts TIN 900, 7 parts TIN 328 (trademarks; Ciba-Geigy Co.) and 60 parts xylene), butyl acrylate, methyl amyl ketone, and Tetralin. This mixture was added to a premixed solution of Cymel 1130, acid catalyst (para-toluene sulfonic acid, 40% solution in butanol), cellosolve acetate, and xylene. The viscosity of the coating formulation was adjusted to 20 sec #4 Ford Cup (80° F.) with a mixture of 8:2 (W/W) xylene and 2-ethyl hexanol. In the case of two component coatings formulated with an organic polyisocyanate, the resin was mixed with n-butyl acetate, a UV stabilizer/absorber package (same as above), butyl acrylate, methyl amyl ketone, and Tetralin. To this mixture the polyisocyanate, predissolved in xylene and cellosolve acetate, was added just before spraying. The viscosity of the coating formulation was adjusted to 20 sec #4 Ford Cup (80° F.) with xylene. Bonderite steel panels and RIM panels were sprayed first with a high solids basecoat and the clearcoat was applied wet on wet. The panels were baked at 250° F. for 30 minutes to give smooth, tough films with excellent flexibility and excellent chemical and oxidative resistance.

TABLE A
CLEARCOAT COMPOSITIONS

| COMPOSITION | XV | XVI | XVII | XVIII | XIX | XX | XXI |
|---|---|---|---|---|---|---|---|
| Resin of Example X | 68.7 | | | | 68.7 | | |
| Resin of Example XII | | 63.6 | | | | 63.6 | |
| Resin of Example XIII | | | 66.6 | | | | |
| Resin of Example XIV | | | | 60.9 | | | 60.9 |
| n-butyl acetate | 7.2 | 7.2 | 7.2 | 7.2 | 7.2 | 7.2 | 7.2 |
| UV stabilizer/absorber package | 13.8 | 13.8 | 13.8 | 13.8 | 13.8 | 13.8 | 13.8 |
| polybutyl acrylate | 0.96 | 0.96 | 0.96 | 0.96 | 0.96 | 0.96 | 0.96 |
| methyl amyl ketone | 18.2 | 18.2 | 18.2 | 18.2 | 18.2 | 18.2 | 18.2 |
| Tetralin[1] | 12 | 12 | 12 | 12 | 12 | 12 | 12 |
| xylene | 10 | 10 | 10 | 10 | 14 | 14 | 14 |
| cellosolve acetate | 1 | 1 | 1 | 1 | 1 | 1 | 1 |
| acid catalyst | 1.2 | 1.2 | 1.2 | 1.2 | | | |
| Cymel 1130[2] | 14.1 | 14.1 | 14.1 | 14.1 | | | |
| Desmodur N—3390[3] | | | | | 22.82 | 22.8 | 22.8 |

[1]1,2,3,4-tetrahydronaphthalene.
[2]Trademark; American Cyanamid Company; alkylated melamine crosslinking agent.
[3]Trademark; Mobay Chemical Corporation; polyisocyanate crosslinking agent.

EXAMPLES XXII-XXIV

One component, high solids, flexible base coat compositions suitable for use in a base/clear automotive coating system were formulated according to the compositions shown in Table B. The components were added in the order listed and in the manner, generally, described for one component clear coat compositions of the preceding examples. The compositions were reduced to 20 sec #4 Ford Cup (80° F.) with methyl amyl ketone before spraying.

TABLE B
BASECOAT COMPOSITIONS

| COMPOSITION | XXII | XXIII | XXIV |
|---|---|---|---|
| Resin of Example X | 125 | | |
| Resin of Example XIII | | 125 | |
| Resin of Example XIV | | | 110 |
| Spenlite LO6-305[1] | 19.2 | 19.2 | 19.2 |
| Cymel 1130[2] | 52.4 | 52.4 | 52.4 |
| Cymel 1161[2] | 35.2 | 35.2 | 35.2 |
| Tinuvin-328[3] | 9.6 | 9.6 | 9.6 |
| para-toluene sulfonic acid solution (40% in butanol) | 2.0 | 2.0 | 2.0 |
| 5000-AR[4] | 123 | 123 | 123 |
| Microgel flow control additive[5] | 96 | 96 | 96 |
| Esterdiol-204[6] | 46 | 46 | 46 |
| cellosolve acetate | 19.2 | 19.2 | 19.2 |
| aluminum stearate | 96 | 96 | 96 |
| xylene | 15.4 | 15.4 | 15.4 |
| isopropyl alcohol | 15.4 | 15.4 | 15.4 |

[1]Trademark; Spencer-Kellog, Buffalo, N.Y.; linear polyurethane modifying agent for aluminum pigment orientation.
[2]Trademark; American Cyanamid Co., Wayne, N.J.; alkylated melamine crosslinking agent.
[3]Trademark; Ciba-Geigy; U.V. absorber.
[4]Trademark; Silberline Co., Lansford, PA.; aluminum paste.
[5]Prepared according to Examples 1-3 of U.S. Pat. No. 4,425,450.
[6]Trademark; Union Carbide Corp.; diol.

EXAMPLE XXV

A millbase was prepared by grinding in a ball mill the following mixture:

| Composition | Parts |
|---|---|
| Resin of Example XIV | 100 |
| Anti-Terra U | 19 |
| Barium sulfate | 547 |
| $TiO_2$ | 103 |
| Carbon black | 4 |
| Xylene | 150 |
| Toluene | 50 |

A two component primer coating composition was formulated by mixing the following components:

| Composition | Parts |
|---|---|
| Millbase (above) | 746 |
| Resin of Example XIV | 425 |
| Desmodur L-2291A[1] | 150 |

| Composition | Parts |
| --- | --- |
| Methyl amyl ketone | 50 |

[1]Trademark; Mobay Chemical Corp.; polyisocyanate crosslinking agent.

The above composition was mixed quickly (within 5 minutes), reduced to 19 sec #4 Ford Cup (80° F.) and sprayed over both Bonderite steel panels and plastic panels. The panels were baked for 30 minutes at 250° F. to give smooth, tough films with excellent solvent resistance (20+ MEK rubs).

EXAMPLES XXVI–XXVII

Two component enamel coatings were formulated according to the compositions shown in Table C. The order of addition was as follows: First the resin was mixed with the flow control additive, cellosolve acetate butyrate and 2-ethyl hexyl acetate. Subsequently, the aluminum paste was predissolved in 15 parts of butyl cellosolve acetate and added to the mixture. After the aluminum paste was dispersed, the rest of the butyl cellosolve acetate was added. To this mixture the polyisocyanate crosslinking agent, predissolved in 30 parts of methyl amyl ketone, was added just before spraying the coating. The viscosity of the paint was adjusted to 20 sec #4 Ford Cup (80° F.) with methyl amyl ketone. Bonderite steel panels and plastic panels were sprayed and baked for 30 minutes at 250° F. to give smooth, tough films with excellent flexibility and MEK resistance.

TABLE C

| Composition | XXVI | XXVII |
| --- | --- | --- |
| Resin of Example XIV | 197 | 197 |
| Microgel flow control additive[1] | 5 | 5 |
| Cellosolve acetate butyrate[2] | 2 | 2 |
| 2-Ethyl hexyl acetate | 15 | 15 |
| Aluminum paste[3] | 9 | 9 |
| Butyl cellosolve acetate | 50 | 50 |
| Desmodur L-2291[4] | 71 | |
| Desmodur Z-4370[4] | | 107 |
| Methyl amyl ketone | 30 | 30 |

[1]Prepared according to Examples 1–3 of U.S. Pat. No. 4,425,450.
[2]Eastman Chemical Co.; CAB 381-0.1 (trademark).
[3]Silberline Co.; 8199-AR (trademark).
[4]Trademark; Mobey Chemical Corp.; polyisocyanate crosslinking agent.

EXAMPLE XXVIII

Hydroxy functional polysiloxane reactant was prepared according to this example. In a suitable reactor were charged 1836 g Esterdiol 204 (trademark; Union Carbide Corp.; diol), 552 g trimethylol propane, 1226 g adipic acid, and 360 g SR-191 (trademark; General Electric Co.; alkoxy silicone). The mixture was heated to 350° F. and a mixture of methanol and water was distilled off until the acid number dropped below 10. The batch was thinned with 1568 g xylene to afford a resin with a viscosity of D-E at 67% non-volatiles and an acid number of 6.3.

EXAMPLE XXIX

Hydroxy functional polysiloxane reactant was prepared according to this example. In a suitable reactor were charged 850 g Esterdiol 204 (trademark; Union Carbide Corp.; diol), 276 g trimethylol propane, 657 g adipic acid, and 225 g SR-882 (trademark; General Electric Co.; alkoxy silicone). The mixture was heated to 300° F. and water distilled off until the acid number dropped below 10. The resin was thinned with 820 g xylene to afford a resin with a viscosity of F at 68% non-volatiles and an acid number of 8.5.

EXAMPLES XXX

Hydroxy functional polysiloxane reactant was prepared according to this example. In a suitable reactor 1836 g Esterdiol 204 (trademark; Union Carbide Corp.; diol), 552 g trimethylol propane, 636 g adipic acid, 645 g phthalic anhydride, and 360 g SR-191 (trademark; General Electric Co.; alkoxy silicone) were charged. The mixture was heated at 250° F. and a mixture of water and methanol distilled off until the acid number dropped below 10. The resin was thinned with 1600 g xylene to afford a resin with a viscosity of K at 72% non-volatiles.

EXAMPLE XXXI

The hydroxy functional polysiloxane reactant prepared according to Example I was urethane modified according to this example. In a suitable reactor was charged 1000 g of the resin from Example I. The resin was heated to reflux and any water present was distilled off. The temperature was lowered to 200° F. and 78 g Desmodur W (trademark; Mobay Chemical Co.; organic diisocyanate) was added dropwise over a period of two hours. The mixture was postreacted at 240° F. until no NCO group was observed in an IR spectra. The resulting hydroxy functional polysiloxane reactant had a viscosity of X-Y at 71% non-volatiles.

EXAMPLE XXXII

The hydroxy functional polysiloxane reactant prepared according to Example I was urethane modified according to this example. In a suitable reactor 1000 g of the resin from Example I was charged. The resin was heated to reflux and any water present was distilled off. The temperature was lowered to 250° F. and 124 g Desmodur W (trademark; Mobay Chemical Co.; organic diisocyanate) was added dropwise over a period of two hours. The mixture was postreacted at 240° F. until no NCO group was observed in an IR spectra. The resulting hydroxy functional polysiloxane reactant had a viscosity of $Z_5$ at 69% non-volatiles.

EXAMPLE XXXIII

The hydroxy functional polysiloxane reactant prepared according to Example XXVIII was urethane modified according to this example. In a suitable reactor 1500 g of the resin from Example XXVIII was charged. The resin was heated to reflux and any water present was distilled off. The temperature was lowered to 200° F. and 111 g Desmodur W (trademark; Mobay Chemical Co.; organic diisocyanate) was added dropwise over a period of two hours. The mixture was postreacted at 225° F. until no NCO group was observed in an IR spectra. The resulting hydroxy functional polysiloxane reactant had a viscosity of $Z_1$–$Z_2$ at 79% non-volatiles.

EXAMPLE XXXIV

Hydroxy functional carbon-carbon double bond-bearing branched polysiloxane macromer (urethane modified) was prepared according to this example. In a suitable reactor 850 g of the resin from Example XXXI, 0.5 g Shell 1201 (trademark; Shell Chemical Co.) catalyst, 70 mg hydroquinone, and 990 g xylene were added. The mixture was heated to 200° F. and 45 g glycidyl methacrylate was added dropwise over a period of 30 minutes. The mixture was postreacted at 200° F. until the WPE rose to a value greater than 2000. The final resin had a viscosity of A at 32% non-volatiles and a WPE greater than 6000.

EXAMPLES XXXV

Hydroxy functional polysiloxane graft copolymer (urethane modified) was prepared according to this example. In a suitable reactor 200 g xylene and 3.6 g cumene hydroperoxide were charged. The mixture was heated to 275° F. at which time a mixture of 892 g of the resin from Example XXXIV, 121 g butyl methacrylate, 12 g hydroxypropyl methacrylate, 25 g styrene, and 3.6 g t-butylperbenzoate was added dropwise over 5 hours. The mixture was postreacted at 280° F. and 525 g of xylene distilled off. The final resin had a K viscosity at 66% non-volatiles.

EXAMPLE XXXVI

Hydroxy functional carbon-carbon double bond-bearing branched polysiloxane macromer (urethane modified) was prepared according to this example. In a suitable reactor 1000 g of the resin from Example XXXII, 0.6 g Shell 1201 catalyst, 70 mg hydroquinone, and 113 g xylene were added. The mixture was heated to 200° F. and 49 g glycidyl methacrylate was added over a 20 minute period. The mixture was postreacted at 200° F. until the WPE rose above 2000. The final resin had an A viscosity at 31% non-volatiles.

EXAMPLE XXXVII

Hydroxy functional polysiloxane graft copolymer (urethane modified, was prepared according to this example. In a suitable reactor 240 g xylene and 3.7 g cumene hydroperoxide were charged. The mixture was heated to 270° F. at which time a mixture of 1000 g of the resin from Example XXXVI, 132 g iso-butyl methacrylate, 13 g hydroxyethyl acrylate, 28 g styrene, 3.7 g t-butyl perbenzoate, and 15 g acrylic acid was added dropwise over a period of 5 hours. The mixture was heated at 270° F. for an additional 2 hours. The mixture was brought to reflux and 690 g xylene stripped off to yield a final resin with a viscosity of $Z_5$ at 68% non-volatiles.

EXAMPLE XXXVIII

The hydroxy functional polysiloxane reactant of Example XXVIII was urethane modified according to this example. In a suitable reactor 1500 g of the resin from Example XXVIII was charged. The resin was heated to 250° F. and 176 g Desmodur W (trademark: Mobay Chemical Co.; diisocyanate) was added dropwise over a period of 2 hours. The mixture was postreacted at 230° F. until no NCO group was observed in an IR spectra. The resultant hydroxy functional polysiloxane reactant had a viscosity of $Z_7$ at 80% non-volatiles.

EXAMPLE XXXIX

Hydroxy functional carbon-carbon double bond-bearing branched polysiloxane macromer (urethane modified) was prepared according to this example. In a suitable reactor 400 g of the resin from Example XXXVIII, 0.26 g Shell 1201 (trademark; Shell Chemical Co.) catalyst, 40 mg hydroquinone, and 522 g xylene were charged. The mixture was heated to 200° F. and 23 g glycidyl methacrylate was added dropwise over 40 minutes. The mixture was postreacted at 200° F. until the WPE rose above 2000. The final resin had a viscosity of A at 34% non-volatiles.

EXAMPLE XL

Hydroxy functional polysiloxane graft copolymer (urethan modified) was prepared according to this example. In a suitable reactor 240 g Exxate 600 (trademark; Exxon Chemical Co.; oxyl hexyl acetate) and 3.6 g cumene hydroperoxide were charged. The mixture was heated to 270° F. at which time a mixture of 911 g of the resin from Example XXIX, 132 g iso-butylmethacrylate, 26 g hydroxyethyl acrylate, 27 g styrene, 3.6 g t-butylperbenzoate, and 15 g acrylic acid was added dropwise over a period of 5 hours. The mixture was postreacted at 270° F. for 2 hours, the solvent brought to reflux, and 500 g xylene stripped off to afford the final resin with a J viscosity at 65% non-volatiles.

EXAMPLES XLI–XLVIII

One and two component flexible clear-coat compositions (the term "flexible" referring to the cured coating) suitable for use in a base/clear automotive coating system were formulated according to the compositions shown in Table D. The order of addition was as follows. In the case of one component coatings formulated with Cymel 1130 (trademark; American Cyanamid Co.; alkylated melamine crosslinking agent), the resin was mixed with n-butylacetate, a UV-stabilizer/absorber package, butyl acrylate, methyl amyl ketone, and Tetralin. The mixture was added to a premixed solution of Cymel 1130, acid catalyst, cellosolve acetate, and xylene. The viscosity of the coating formulation was adjusted to 20 sec. #4 Ford Cup (80° F.) with a mixture of xylene and 2-ethylhexanol. In the case of two component coatings formulated with an organic polyisocyanate, the resin was mixed with n-butylacetate, a UV-stabilizer/absorber package, butyl acrylate, methyl amyl ketone, and Tetralin. To this mixture the polyisocyanate, predissolved in xylene and cellosolve acetate, was added just before spraying. The viscosity of the coating formulation was adjusted to 20 sec #4 Ford Cup (80° F.) with xylene. Bonderite steel panels and RIM panels were sprayed first with a high solids base coat and the clear coat was applied wet on wet. The panels were baked at 250° F. for 30 minutes to yield smooth, tough films with excellent flexibility and excellent chemical and oxidative stability.

TABLE D

| COMPOSITION | CLEARCOAT COMPOSITIONS EXAMPLE | | | | | | | |
|---|---|---|---|---|---|---|---|---|
| | XLI | XLII | XLIII | XLIV | XLV | XLVI | XLVII | XLVIII |
| Resin of Example XXXIII | 53.9 | | | | 53.9 | | | |
| Resin of Example XXXV | | 64.5 | | | | 64.5 | | |
| Resin of Example XXXVII | | | 62.6 | | | | 62.6 | |
| Resin of Example XL | | | | 65.5 | | | | 65.5 |
| n-butyl acetate | 7.2 | 7.2 | 7.2 | 7.2 | 7.2 | 7.2 | 7.2 | 7.2 |
| UV stabilizer/absorber package[1] | 13.8 | 13.8 | 13.8 | 13.8 | 13.8 | 13.8 | 13.8 | 13.8 |

TABLE D-continued

CLEARCOAT COMPOSITIONS

| COMPOSITION | EXAMPLE | | | | | | | |
|---|---|---|---|---|---|---|---|---|
| | XLI | XLII | XLIII | XLIV | XLV | XLVI | XLVII | XLVIII |
| polybutyl acrylate | 0.96 | 0.96 | 0.96 | 0.96 | 0.96 | 0.96 | 0.96 | 0.96 |
| methyl amyl ketone | 18.2 | 18.2 | 18.2 | 18.2 | 18.2 | 18.2 | 18.2 | 18.2 |
| Tetralin[2] | 12 | 12 | 12 | 12 | 12 | 12 | 12 | 12 |
| xylene | 10 | 10 | 10 | 10 | 14 | 14 | 14 | 14 |
| cellosolve acetate | 1 | 1 | 1 | 1 | 1 | 1 | 1 | 1 |
| Acid catalyst[3] | 1.2 | 1.2 | 1.2 | 1.2 | | | | |
| Cymel 1130[4] | 14.1 | 14.1 | 14.1 | 14.1 | | | | |
| Desmodur N-3390[5] | | | | | 22.8 | 22.8 | 22.8 | 22.8 |

[1]Solution of 25 parts TIM 079L, 8 parts TIM 900, 7 parts TIM 328 (trademarks; Ciba-Geigy Co.) and 60 parts xylene.
[2]1,2,3,4-tetrahydronaphthalene.
[3]Para-toluene sulfonic acid, 40% solution in butanol.
[4]Trademark; American Cyanamid Company; alkylated melamine crosslinking agent.
[5]Trademark; Mobay Chemical Corporation; polyisocyanate crosslinking agent.

EXAMPLES XLIX-LI

One component, high solids, flexible base coat compositions suitable for use in a base/clear automotive coating system were formulated according to the compositions shown in Table E. The components were added in the order listed and in the manner, generally, described for one component clear coat compositions of the preceding examples. The compositions were reduced to 20 sec #4 Ford Cup (80° F.) with methyl amyl ketone.

TABLE E

BASECOAT COMPOSITIONS

| COMPOSITION | EXAMPLE | | |
|---|---|---|---|
| | XLIX | L | LI |
| Resin of Example XXXV | 125 | | |
| Resin of Example XXXVII | | 125 | |
| Resin of Example XL | | | 125 |
| Spenlite LO6-30S[1] | 19.2 | 19.2 | 19.2 |
| Cymel 1130[2] | 52.4 | 52.4 | 52.4 |
| Cymel 1161[2] | 35.2 | 35.2 | 35.2 |
| Tinuvin-328[3] | 9.6 | 9.6 | 9.6 |
| para-toluene sulfonic acid solution (40% in butanol) | 2.0 | 2.0 | 2.0 |
| 5000-AR[4] | 123 | 123 | 123 |
| Microgel flow control additive[5] | 96 | 96 | 96 |
| Esterdiol-204[6] | 46 | 46 | 46 |
| cellosolve acetate | 19.2 | 19.2 | 19.2 |
| aluminum stearate | 96 | 96 | 96 |
| xylene | 15.4 | 15.4 | 15.4 |
| isopropyl alcohol | 15.4 | 15.4 | 15.4 |

[1]Trademark; Spencer-Kellog, Buffalo, N.Y.; linear polyurethane modifying agent for aluminum pigment orientation.
[2]Trademark; American Cyanamid Co., Wayne, N.J.; alkylated melamine crosslinking agent.
[3]Trademark; Ciba-Geigy; U.V. absorber.
[4]Trademark; Silberline Co., Lansford, PA.; aluminum paste.
[5]Prepared according to Examples 1-3 of U.S. Pat. No. 4,425,450.
[6]Trademark; Union Carbide Corp.; diol.

EXAMPLE LII

A millbase was prepared by grinding in a ball mill the following mixture:

| Composition | Parts |
|---|---|
| Resin of Example XL | 107 |
| Anti-Terra U | 19 |
| Barium sulfate | 547 |
| TiO$_2$ | 103 |
| Carbon black | 4 |
| Xylene | 150 |
| Toluene | 50 |

A two component primer coating composition was formulated by mixing the following components:

| Composition | Parts |
|---|---|
| Millbase (above) | 746 |
| Resin of Example XL | 458 |
| Desmodur L-2291A[1] | 150 |
| Methyl amyl ketone | 50 |

[1]Trademark; Mobay Chemical Corp.; polyisocyanate crosslinking agent.

The above composition was mixed (within 5 minutes), reduced to 19 sec #4 Ford Cup (80° F.) and sprayed over both Bonderite steel panels and plastic panels. The panels were baked for 30 minutes at 250° F. to give smooth, tough films with excellent solvent resistance (20+ MEK rubs).

EXAMPLES LIII-LIV

Two component enamel coatings were formulated according to the compositions shown in Table F. The order of addition was as follows: First the resin was mixed with the flow control additive, cellulose acetate butyrate and 2-ethyl hexyl acetate. Subsequently, the aluminum paste was predissolved in 15 parts of butyl cellosolve acetate and added to the mixture. After the aluminum paste was dispersed, the rest of the butyl cellosolve acetate was added. To this mixture the polyisocyanate crosslinking agent, predissolved in 30 parts of methyl amyl ketone, was added just before spraying the coating. The viscosity of the paint was adjusted to 20 sec #4 Ford Cup (80° F.) with methyl amyl ketone. Bonderite steel panels and plastic panels were sprayed and baked for 30 minutes at 250° F. to give smooth, tough films with excellent flexibility and MEK resistance.

TABLE F

| Composition | LIII | LIV |
|---|---|---|
| Resin of Example XL | 212 | 212 |
| Microgel flow control additive[1] | 5 | 5 |
| Cellosolve acetate Butyrate[2] | 2 | 2 |
| 2-Ethyl hexyl acetate | 15 | 15 |
| Aluminum paste[3] | 9 | 9 |
| Butyl cellosolve acetate | 50 | 50 |
| Desmodur L-2291[4] | 71 | 107 |
| Desmodur Z-4370[4] | | 30 |
| Methyl amyl ketone | 30 | 30 |

[1]Prepared according to Examples 1-3 of U.S. Pat. No. 4,425,450.
[2]Eastman Chemical Co.; CAB 381-0.1 (trademark).
[3]Silberline Co.,; 8199-AR (trademark).
[4]Trademark; Mobay Chemical Corp.; polyisocyanate crosslinking agent.

We claim:

1. A solvent based high solids enamel coating composition adapted for application as a flexible coating on metal and plastic substrates, comprising:
   (A) hydroxy functional polysiloxane graft copolymer of number average molecular weight about 1,000–4,000, having a hydroxyl number between about 50 and about 150 and about 1–10 urethane linkages per molecule, and being the reaction product of carbon-carbon double bond-reactive monoethylenically unsaturated monomer with carbon-carbon double bond-bearing branched polysiloxane macromer under free radical polymerization reaction conditions, said monomer bearing substantially no functionality which is substantially reactive with hydroxy functionality of said macromer under said reaction conditions, said macromer being the reaction product of glycidyl methacrylate with hydroxy functional oligomeric polysiloxane reactant having a molecular weight between about 1,000–3,000 and a hydroxyl number between about 30–300;
   (B) alkylated melamine crosslinking agent, said crosslinking agent being included in an amount sufficient to provide between about 0.5 and about 1.6 hydroxy reactive group per hydroxy group of said polysiloxane graft copolymer.

2. The coating composition of claim 1 wherein said glycidyl methacrylate and hydroxy functional oligomeric polysiloxane are reacted in a 1:1 molar ratio.

3. The coating composition of claim 1, wherein said carbon-carbon double bond-reactive monoethylenically unsaturated monomer consists of acrylate monomers selected from the group consisting of alkylacrylate, alkyl methacrylate, hydroxyalkylacrylate, and hydroxyalkyl methacrylate.

4. The coating composition of claim 1 wherein said carbon-carbon double bond-reactive monoethylenically unsaturated monomer consists of monomers selected from the group consisting of acrylic acid, methacrylic acid, styrene, methylacrylate, ethylacrylate, propylacrylate, butylacrylate, methylmethacrylate, ethylmethacrylate, propylmethacrylate, butylmethacrylate, hexylacrylate, 2-ethylhexylacrylate, laurylmethacrylate, glycidylmethacrylate, 2-hydroxyethylacrylate, 2-hydroxypropylacrylate, 2-hydroxybutylacrylate, 2-hydroxyethylmethacrylate, 2-hydroxypropylmethacrylate, 3-hydroxypropylmethacrylate, 2-hydroxybutylmethacrylate.

5. The coating composition of claim 1 in which urethane linkages are introduced to the hydroxy functional graft copolymer by reacting the hydroxy functional oligomeric polysiloxane reactant of the macromer with an organic polyisocyanate to form a hydroxy functional oligomeric polysiloxane reactant containing urethane linkages which then is reacted with glycidylmethacrylate to form the macromer.

6. The coating composition of claim 1 wherein the oligomeric polysiloxane reactant is urethane modified, comprising the reaction product of organic diisocyanate with the reaction product of (1) polyol comprising at least about 5 percent by weight triol with (ii) second reactant selected from dicarboxylic acid and alkoxy silicone, at least a portion of said second reactant being said alkoxy silicone, said alkoxy silicone having number average molecular weight between about 350 and about 1,000 and having the general formula:

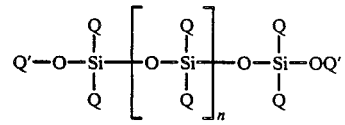

wherein each Q is selected from the group consisting of hydrogen, alkyl, alkoxy, aryl and aryloxy; each Q' is alkyl; and n is 1 to about 75; and said dicarboxylic acid is selected from the group consisting of saturated and unsaturated, cyclic and acyclic aliphatic dicarboxylic acids, aromatic dicarboxylic acids, suitable anhydrides thereof, and any mixture thereof.

7. The coating composition of claim 6, wherein said alkoxy silicone formula variable n has a value of from 1 to about 25.

8. The coating composition of claim 6, wherein said alkoxy silicone has siloxane content of about 89%, methoxy content of about 15%, and number average molecular weight of about 600.

9. The coating composition of claim 6, wherein said dicarboxylic acid is a saturated, acyclic, aliphatic dimer acids of about 6–36 carbons.

10. The coating composition of claim 6, wherein said dicarboxylic acid is selected from the group consisting of adipic acid, azelaic acid, sebasic acid, dodecane dicarboxylic acid and any mixture thereof.

11. The coating composition of claim 6 wherein said polyol comprises diol and triol in hydroxy equivalent ratio of from about 4:1 to about 1:4.

12. The coating composition of claim 11 wherein said diol has molecular weight of about 60–500 and is selected from the group consisting of trimethylene glycol, triethylene glycol, 1,4-cyclohexane dimethanol, alkyl substituted or unsubstituted propanediol, butanediol, pentanediol and hexanediol, and any mixture thereof.

13. The coating composition of claim 6 wherein said triol is selected from the group consisting of trimethylol propane, polycaprolactone triol, and any mixture thereof.

14. The coating composition of claim 6, wherein said iisocyanate is selected from the group consisting of phenylene diisocyanate, biphenyl diisocyanate, toluene diisocyanate, isophorone diisocyanate, 3,3'-dimethyl-4,4'-biphenylene diisocyanate, diisocyanatoalkane wherein the alkane moiety has about three to about ten carbons, and any mixtures thereof.

* * * * *